F. SCHUBERT.
INSTRUMENT MOUNTING.
APPLICATION FILED MAR. 5, 1913.

1,116,498.

Patented Nov. 10, 1914.

Witnesses:
Lillian H. Neveil
William S. Atchison

Inventor:
Frederick Schubert,
By Jas. C. Wobensmith
Attorney.

UNITED STATES PATENT OFFICE.

FREDERICK SCHUBERT, OF SELLERSVILLE, PENNSYLVANIA.

INSTRUMENT-MOUNTING.

1,116,498.      Specification of Letters Patent.     Patented Nov. 10, 1914.

Application filed March 5, 1913. Serial No. 752,046.

*To all whom it may concern:*

Be it known that I, FREDERICK SCHUBERT, a citizen of the United States, residing at Sellersville, in the county of Bucks and State of Pennsylvania, have invented certain new and useful Improvements in Instrument-Mountings, of which the following is a specification.

My invention relates to instrument mountings, that is to say, to means for mounting pressure, electrical and other gages and similar instruments on a suitable supporting plate.

The principal object of my invention is to provide a simple and efficient means for mounting various instruments upon the supporting plate without undue projection beyond the front face of said plate. In automobiles, for instance, the various gages, etc., are fastened on the dashboard facing the chauffeur, and it is desirable that these instruments, which are of various sizes and depths, should present a smooth uniform appearance and not project an appreciable distance beyond the surface of the dashboard. Where the dashboard or the plate to which the instruments are fastened is made of relatively thin material, such as sheet metal or the like, it has heretofore been difficult to neatly mount the instruments in the desired manner as aforesaid, and my invention therefore contemplates improved means for mounting instruments which is particularly useful for mounting the same on a thin supporting plate.

The nature and characteristic features of my invention will be more readily understood from the following description taken in connection with the accompanying drawings forming part hereof, in which—

Figure 1:
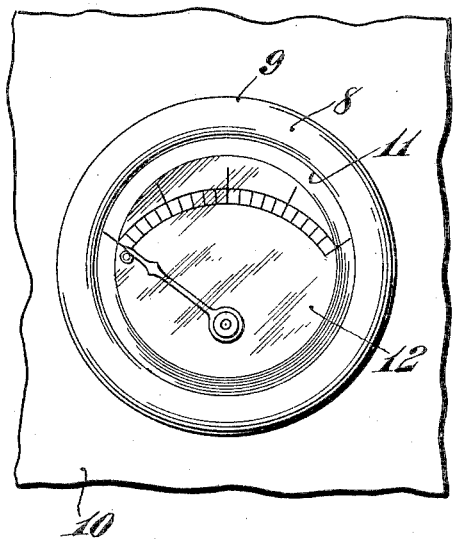
Figure 2:
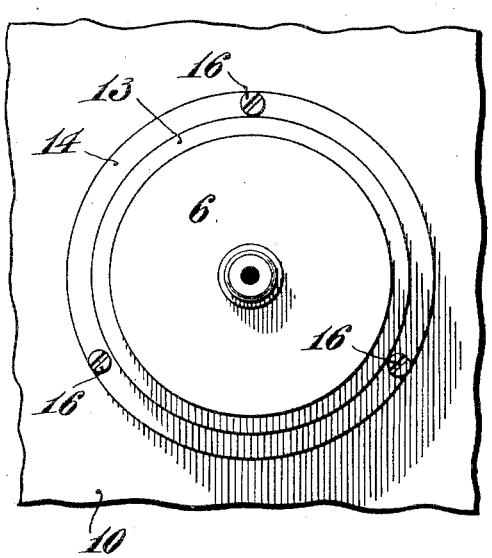
Figure 3:
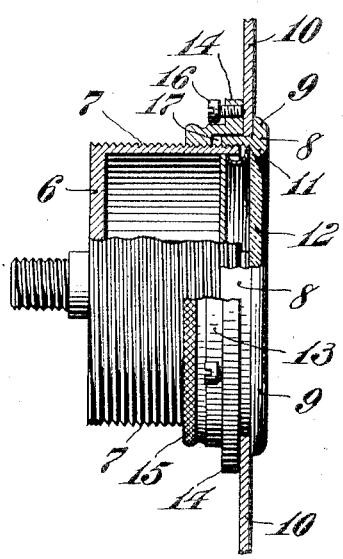

Figure 1 is a front elevation of a gage or similar instrument, the same being shown mounted in a fragmentary portion of the plate by means embodying the main features of my present invention; Fig. 2 is a rear view thereof; Fig. 3 is a view, partly in side elevation and partly in section, of the structure shown in Figs. 1 and 2; and Fig. 4 is an enlarged fragmentary detail view illustrating a modified form of my invention.

Referring to the drawings, in the particular embodiment of my invention therein shown, 6 is the housing or casing of the instrument which is cylindrical in shape and is provided on its exterior surface with screw threads 7. Mounted in a fixed relative position on the front end of the casing 6, preferably by means of the threads 7, is a ring member 8 which is provided with an outwardly extending flange 9 adapted to engage the front face of the plate 10 or other member upon which the instrument is mounted. The ring 8 may also if desired be provided with an inwardly extending flange 11 which may serve to retain the glass face member 12 which is usually found in instruments of this character. A ring 13 is also threaded on the casing 6 and is adapted to be advanced or retracted on the threads 7 according to the thickness of the supporting plate 10. The ring 13 is preferably provided with an outwardly extending flange 14 which in the normal condition of the structure bears against the rear face of the plate 10. The ring 13 may also be provided with a knurled rib 15 to facilitate the mounting or demounting of the instrument in place on the plate 10. The flange 14 of ring 13 also carries several screws 16 which are threaded in said flange and provided with pointed portions at their inner ends which are adapted to engage and bite into the plate 10 so as to lock the ring 13 against undesirable rotation which would cause the instrument to become loose in its mounting, and which might otherwise occur on account of the vibration which usually exists in the places where these instruments are used. The ring 13 overlaps the ring 8 and as shown in Figs. 1, 2 and 3 is recessed as at 17 so as to permit said ring to be brought into engagement with the rear face of the plate 10 notwithstanding that the ring 8 may be mounted upon the same threaded portion 7 of the casing 6 upon which the ring 13 is mounted.

Figure 4:
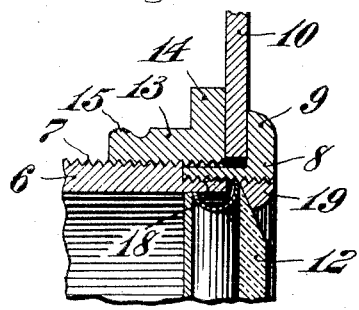

In the structure as shown in Fig. 4, instead of recessing the ring 13 as at 17, the ring 8 is made of smaller outside diameter than the threaded portion 7 of the casing 6, and is mounted in a threaded recess 18 at the outer end of said casing, and the ring 13 is thereby permitted to overlap the ring 8 so as to permit it to engage the rear face of the plate 10 in a manner similar to that of the structure shown in Fig. 3 and enable the instrument to be mounted in the plate 10 in the same effective manner. Instead of retaining the glass 12 by means of an integral inwardly extending flange 12, a separate detachable ring 19 may be employed as shown in Fig. 4 and this ring 19 may be threaded in the ring 8.

It will thus be seen that there is provided a simple and efficient means for mounting instruments which will enable the same to present a neat substantially flush appearance notwithstanding that the plate in which they are mounted is made of relatively thin material. and this effect is obtained by the overlapping of the rings 8 and 13 respectively.

Having thus described the nature and characteristic features of my invention what I claim as new and desire to secure by Letters Patent is:—

1. An instrument casing, a plate in which said casing is mounted, a ring mounted in a fixed position on the front end of said casing and having an outwardly extending flange adapted to engage the front face of said plate, and a ring adapted to be advanced on the casing to engage the rear face of said plate, said rings being adapted to overlap each other.

2. An instrument casing, a plate in which said casing is mounted, a ring mounted in a fixed position on the front end of said casing and having an outwardly extending flange adapted to engage the front face of said plate, and a ring threaded on the casing adapted to engage the rear face of said plate and adapted to overlap the first mentioned ring.

3. An instrument casing, a plate in which said casing is mounted, a ring mounted in a fixed position on the front end of said casing and having an outwardly extending flange adapted to engage the front face of said plate, a ring threaded on the casing adapted to engage the rear face of said plate and adapted to overlap the first mentioned ring, and means for locking said ring against rotation.

4. An instrument casing, a plate in which said casing is mounted, a ring mounted in a fixed position on the front end of said casing and having an outwardly extending flange adapted to engage the front face of said plate, a ring threaded on the casing adapted to engage the rear face of said plate and adapted to overlap the first mentioned ring, and means for locking said ring against rotation, said means comprising screws threaded in said ring and adapted to engage said plate.

5. An instrument casing having an outer threaded surface, a plate in which said casing is mounted, a ring mounted on the threaded portion of the casing in a fixed position and having an outwardly extending flange engaging the front face of the plate, a second ring mounted on the threaded portion of the casing and adapted to be advanced thereon to engage the rear face of the plate, said second ring being recessed so as to overlap the first mentioned ring when the plate is made of relatively thin material.

In testimony whereof, I have hereunto signed my name in the presence of two witnesses.

FREDERICK SCHUBERT.

Witnesses:
WILLIAM S. ATCHISON,
LILLIAN H. MIEIL.